United States Patent [19]

Epstein et al.

[11] Patent Number: 5,172,854
[45] Date of Patent: Dec. 22, 1992

[54] RECLOSABLE, REUSABLE PACKAGE

[75] Inventors: Moshe Epstein, 2530 Queensway, Northbrook, Ill. 60062; Robert D. Tischer, Oak Forest, Ill.

[73] Assignee: Moshe Epstein, Northbrook, Ill.

[21] Appl. No.: 777,063

[22] Filed: Oct. 16, 1991

[51] Int. Cl.⁵ .......................... B65D 1/34; B65D 27/16
[52] U.S. Cl. .............................. 229/123.3; 229/123.2; 229/125.35; 229/247; 383/204
[58] Field of Search ............... 229/123.2, 123.3, 87.08, 229/125.35, 247; 220/254, 359; 383/61, 203, 204

[56] References Cited

U.S. PATENT DOCUMENTS

| | | | |
|---|---|---|---|
| 3,184,149 | 5/1965 | Repko | 383/203 |
| 3,272,422 | 9/1966 | Miller | 229/125.35 |
| 3,454,210 | 7/1969 | Spiegel et al. | 229/125.35 |
| 3,554,436 | 1/1971 | Palmer | 383/204 |
| 3,613,874 | 10/1971 | Miller | 383/204 |
| 3,827,472 | 8/1974 | Uramoto | 383/204 |
| 3,827,625 | 8/1974 | Miller | 229/247 |
| 4,768,703 | 9/1988 | Sosler et al. | 229/123.3 |
| 4,785,940 | 11/1988 | Wilson | 383/204 |
| 4,823,961 | 4/1989 | Griesbach et al. | 383/61 |
| 4,898,280 | 2/1990 | Runge | 383/61 |

Primary Examiner—Gary E. Elkins
Attorney, Agent, or Firm—Milton S. Gerstein; Marvin N. Benn

[57] ABSTRACT

A package that is unreusable and reclosable, which package may be repeatedly used by the consumer for storing the contents therein even after multiple openings of the package, with such package protecting the contents thereof in a closed-package-like manner. The package is provided with at least one strip of resealable glue, which strip is located interiorly of the peripheral heat-seals, so that, after the package is cut open by cutting away the heat-sealed edge in close juxtaposition to the glue-strip, the two facing plastic-film layes of the package may be pulled apart, thereby separating the glue-strip, and, thereby, allowing access to the interior of the pocket. A package forming apparatus for making the package of the invention is also disclosed.

10 Claims, 6 Drawing Sheets

RECLOSABLE, REUSABLE PACKAGE

BACKGROUND OF THE INVENTION

The present invention is directed to a package in which are stored meats, cheeses, and the like, for display and sale in a supermarket, or similar retail store.

Packages, such as vacuum-packages, for storing meats, such as hot dogs, cold cuts, and the like, are well-known, and conventionally have a centrally-located pocket in which is stored the product to be sold. Typically, the plastic film from which the package is made is transparent in order for the consumer to see the product. These conventional packages may use a converted film, in which the film is provided with an interior-facing, integral layer of sealant-material, whereby the package is heat-sealed completely about its peripheral, or circumferential, edges after a vacuum has been formed in the interior of the pocket storing the product. Other, conventional packages use nonconverted film, in which no inner, sealing layer is provided. For this non-converted-film package, sealing of the package is achieved by placing strips of non-resealable glue about the peripheral edges of the package, and applying heat thereto during the last stage of sealing the package.

The conventional, prior-art package is used by the consumer by tearing open one side edge of the package, by which access to the interior of the pocket is achieved, so that the contents may be removed. The conventional package is not specifically designed for storing the products therein after the package has been torn open at one edge thereof. If a consumer does not wish to use all of the contents of the package at one time, he may leave the remaining contents in the pocket, and store the opened package in the refrigerator, or the like, or he may place the opened bag in a separate storage bag, or the like.

SUMMARY OF THE INVENTION

It is, therefore, the primary objective of the present invention to provide a package that is reusable and reclosable, which package may be repeatedly used by the consumer for storing the contents therein even after multiple openings of the package, with such package protecting the contents thereof.

It is also an objective of the invention to provide an apparatus for forming the reusable, reclosable package of the invention.

Toward these and other ends, the package of the invention utilizes a converted-film package, with the seal thereof being provided via peripheral heat seals, in the manner of a conventional converted-film package. In addition, the package of the invention is provided with at least one strip of resealable glue, which strip is located interiorly of the peripheral heat-seals, so that, after the package is cut open by cutting away the heat-sealed edge in close juxtaposition to the glue-strip, the two facing plastic-film layers of the package may be pulled apart, thereby separating the glue-strip, and, thereby, allowing access to the interior of the pocket, in order to access the contents thereof. After having removed a portion of the contents of the package, it may be reclosed by pressing the two layers together along the glue line. The package may then again be reopened for accessing the contents thereof the next time such is required. The glue-strip allowing for the reusing and reclosing of the package is applied to an exterior-facing portion of one of the two layers making up the film-package. The glue-strip is typically heat-treated, when the last peripheral seal is heated, although such is not a necessity. Thus, when the package is opened for the first time, part of the glue-strip remains attached to a corresponding, juxtapositioned section of the other layer of film to which the glue-strip was not applied, to, thereby, form a reclosable strip of glue contained on both layers of the package, even though only one layer had been initially coated with it. The package of the invention may also use nonconverted film, whereby the peripheral seals are provided by non-resealing glue in the usual manner, where the strips of non-resealing glue are heat-treated for forming the peripheral seal.

BRIEF DESCRIPTION OF THE DRAWINGS

The invention will be more readily understood with reference to the accompanying drawing, wherein.

DETAILED DESCRIPTION OF THE INVENTION

Figure 1:
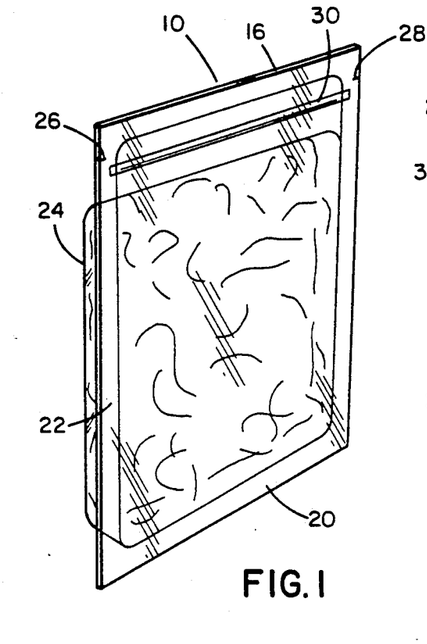
FIG. 1 is an isometric view of the reusable, reclosable package of the invention.
Figure 2:
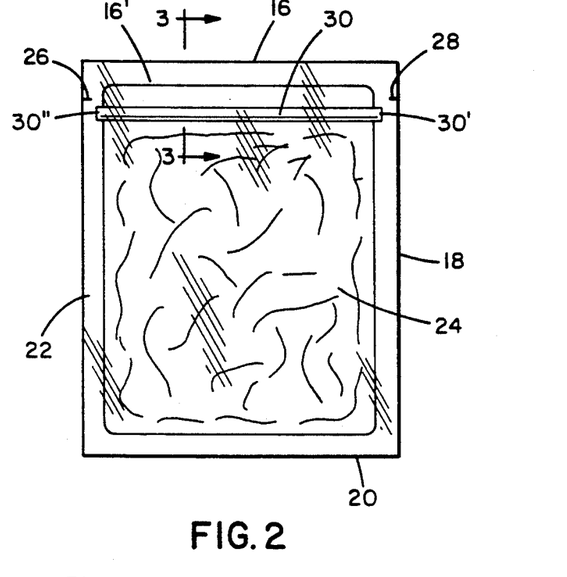
FIG. 2 is a front, elevational view thereof.
Figures 3, 4:
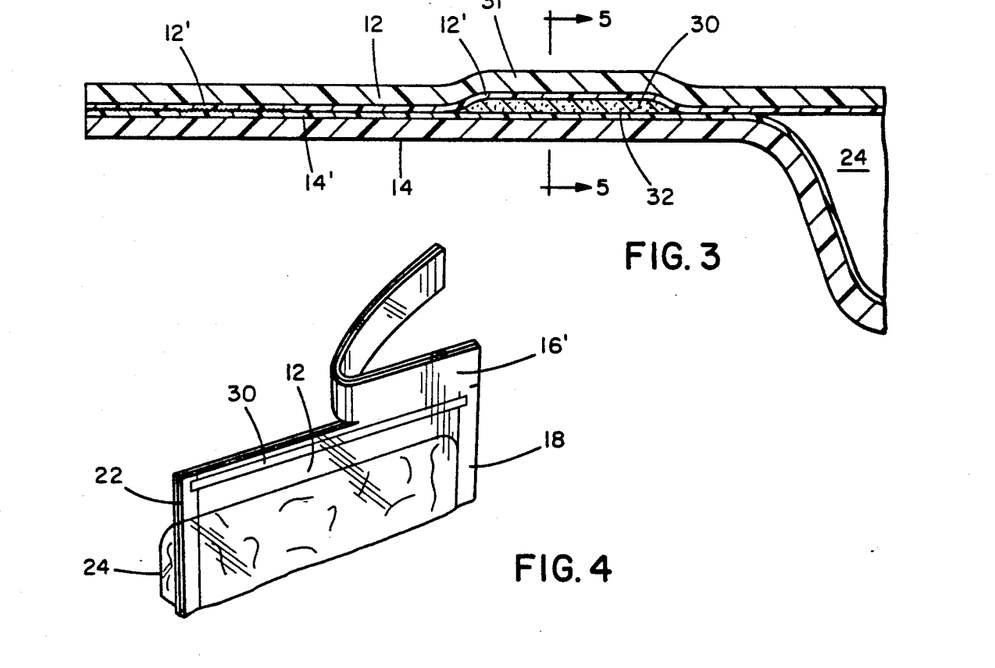
FIG. 3 is a cross-sectional view taken along line 3—3 of FIG. 2.
FIG. 4 is a partial, isometric view of the package of the invention shown partially cut open along a sealed edge in close proximity to the reclosable glue-strip of the invention.
Figure 5:
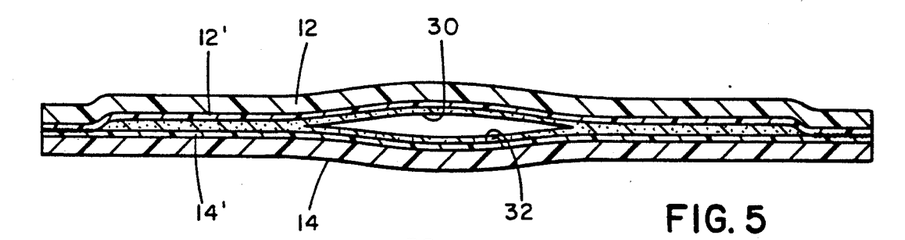
FIG. 5 is a cross-sectional view taken along line 5—5 of FIG. 3
Figure 6:
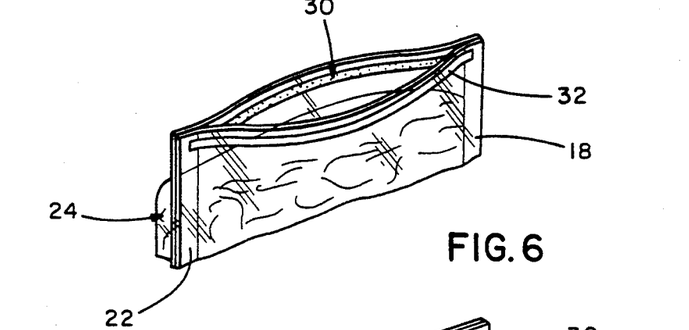
FIG. 6 is an isometric view of the opened package of the invention, with glue-strips thus being formed on interior-facing sections of the package.
Figure 7:
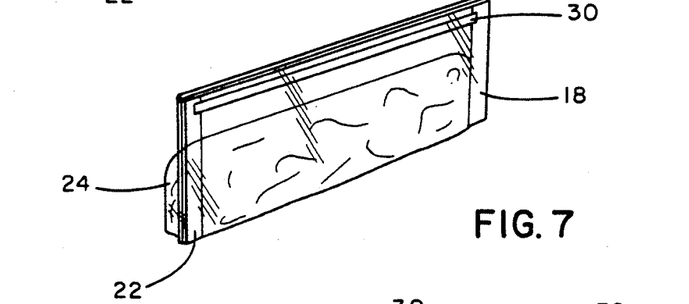
FIG. 7 is an isometric view of the reclosed package of FIG. 6.

Referring now to the drawing in greater detail, and to FIGS. 1-8 for now, the reclosable, reusable package of the invention is indicated generally by reference numeral 10. The package 10, for illustrative purposes only, is a vacuum-package, though it may be one not having a vacuum, and is similar in most respects to a conventional heat-sealed, converted-film package, and has a generally rectilinear-shaped configuration. The package 10 is made up of two, facing layers of converted plastic film 12, 14, which are heat-sealed about the rectilinear periphery thereof, at the edges of annular, flat surface-portions 16, 18, 20, 22, in the conventional manner. A pocket 24 is formed in the layer 14 for storing therein the product being packaged. The plastic film may be transparent in order to allow the consumer to see the contents before purchase, and each layer comprises a thin film of sealant material 12', 14' by which the two layers are bonded to each other, as seen in FIG. 2. During the manufacture of the package 10, the pocket 24 is formed and bounded by the four, annular, sealed surface-portions 16-22, with the essentially flat surface-portion 16 serving as a section which may gripped by the hand for carrying the package, for displaying the package at point-of-sale, or the like and then a vacuum is created as the outer surfaces are heat-sealed, so as to provide a package, in the conventional manner. In the preferred embodiment, one, upper, narrow, annular surface-portion 16 is used as the surface by which the package is opened. The two, longer, side, annular surface-portions 18, 22 are provided with a pair of oppositely-disposed notches 26, 28, by which one may tear open the package by pulling along the top strip 16' above the notches, as seen in FIG. 2. The notches 26, 28 lie along a linear line that is situated below the seal of the upper edge of the annular surface-portion 16. Thus, when the package is opened by tearing away the strip 16', the seal formed in the upper edge of the surface-portion 16, and contained in the strip 16', is also torn away, as seen in FIG. 4. According to the invention, there is provided a strip 30 of re-sealable glue that is used for reclosing the package after access to the pocket, to remove part of the contents thereof, has been done. The strip 30 is provided in the annular surface-portion 16 and located below the line connecting the two notches 26, 28, when viewing FIG. 2, so that, after the upper portion 16' has been torn or cut away, the glue-strip 30 is left remaining, which glue-strip is now located directly adjacent and parallel to the top edge of the thus-opened package, as seen in FIG. 4. After the strip 16' has been torn away, the glue-strip 30 still keeps the package closed, until one pulls the two layers 12, 14 apart adjacent the glue-strip, thus pulling the two layers apart to open the package, and gaining access to the interior of the pocket 24 for removing the contents therein, as seen in FIG. 6. After removing part of the contents, the two layers 12, 14 are forced together again at the glue-strip to thus cause the adherence therebetween, for closing the bag, and allowing the very same package 10 to be used a reclosable, reusable storage bag for the remaining contents in the pocket 24. It is also possible to use nonconverted film instead of the converted film layers 12, 14. When using nonconverted film, which does not contain the sealing material face 12' or 14', non-resealing glue is used instead to form the peripheral seal, as is well-known.

As can be seen in FIG. 2, when forming the package 10, the glue-strip 30 is applied only to the exterior-facing surface-face of the inner layer 14, which surface-face is constituted by the sealing film. During subsequent completion of the package 10, when the last sealed edge surface 16 is heat-sealed, the glue-strip 30 is also forced against the mutually-facing, interior-facing surface-face 14' of the outer layer 12, whereby the glue-strip binds the two layer together therealong. It is, however, noted that it is possible to use have the resealable glue-strip 30 that is not heat-treated at all, with such glue-strip still performing its necessary functions of providing a reusable, reclosable opening. The glue-strip 30 is preferably parallel to the outer edge of the annular surface-portion 16, and has a length such that its two ends 30', 30" overlap into the two longer side edge surfaces 18, 22, respectively, so as to ensure that the package will closed along the entire width of the package for air-tight reclosing after each opening thereof, to thereby provide an air-tight, reusable storage bag.

Figure 8:
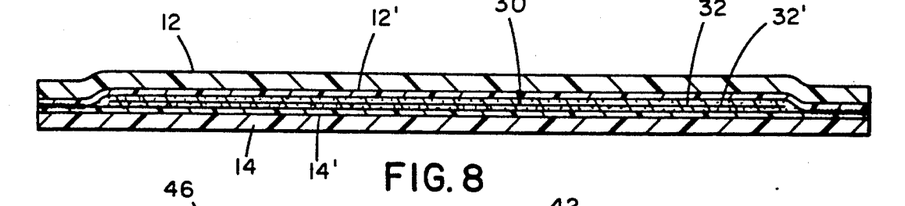
FIG. 8 is a longitudinal, cross-sectional view showing the reclosed package of FIG. 7.

Applying the glue-strip 30 to only one layer allows for the package-forming process to proceed more quickly, without comprising on the quality of the adhesive, reclosing characteristics of the glue-strip. No compromise of quality exists, according to the invention, since the re-sealable glue, from which the glue-strip 30 is made, is also, in the preferred embodiment, heat-treated in the package forming apparatus at the same time that the annular surface-portion 16 is heat treated for forming the seal thereat, which causes the upper surface 32 of the glue-strip 30 to adhere to the surface face 12' of the outer layer 12, as seen in FIG. 3. The heat-treatment of the glue-strip, by the stage of the package sealing apparatus where the annular surface 16 is heat sealed, causes part of the upper surface 32 of the glue-strip to become permanently bonded to the sealing-layer 12' of the outer film layer 12. Thus, as can be seen in FIGS. 5 and 6, when the package 10 is opened for the first time, and the two layers 14, 16 pulled apart along the glue-line 30, part of the upper surface 32 of the glue-strip 30 remains on the surface face 12', thereby creating a highly effective, tacky reclosable opening. As seen in FIG. 5, approximately half of the thickness of the glue-strip 30 is bonded to the outer layer 12, and half to the inner layer 14, as the glue-strip 30 is separated along its mid-line 32' during the first opening of the package. Upon reclosing of the bag, the two halves stick to one another again at the midline 32', as seen in FIG. 8.

Figure 9:
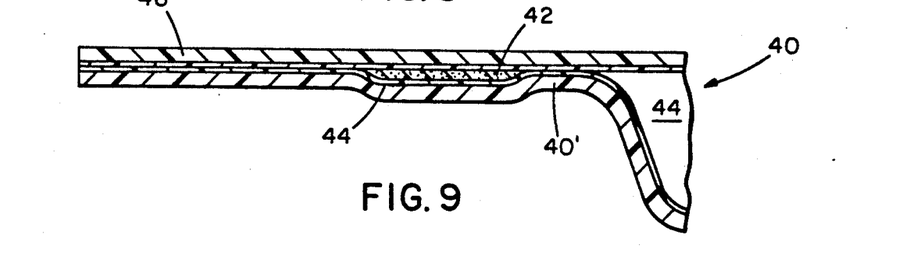
FIG. 9 is a cross-sectional view similar to FIG. 3, but showing a modification thereof where a shallow, linear pocket is formed in a section of the interior layer of the package, into which shallow, linear depression the strip of sealing glue is deposited, so that the other, exterior layer of the package does not bulge outwardly because of the gluestrip.

A modified package 40 of the invention is shown in FIG. 9. In this embodiment, a glue-strip 42 is applied to a shallow, linear well or cavity 44 of the exterior facing portion of the inner layer 40'. During the forming of the pocket 44 in a package forming machine, the shallow, linear well or cavity 44 is formed in the inner layer 40', and the glue-strip 42 applied therein. By applying the glue-strip in the cavity 44 of the inner layer, the outer layer 46 of the package is allowed to lie flush against the inner layer, whereby no outward bulge is created on the outer layer, unlike that of the package 10 of FIG. 1., where an outward bulge 31 is created and visible in the outer layer. Thus, the package 40 exhibits a flat, exterior surface front when displayed at point-of-sale.

Figure 10:
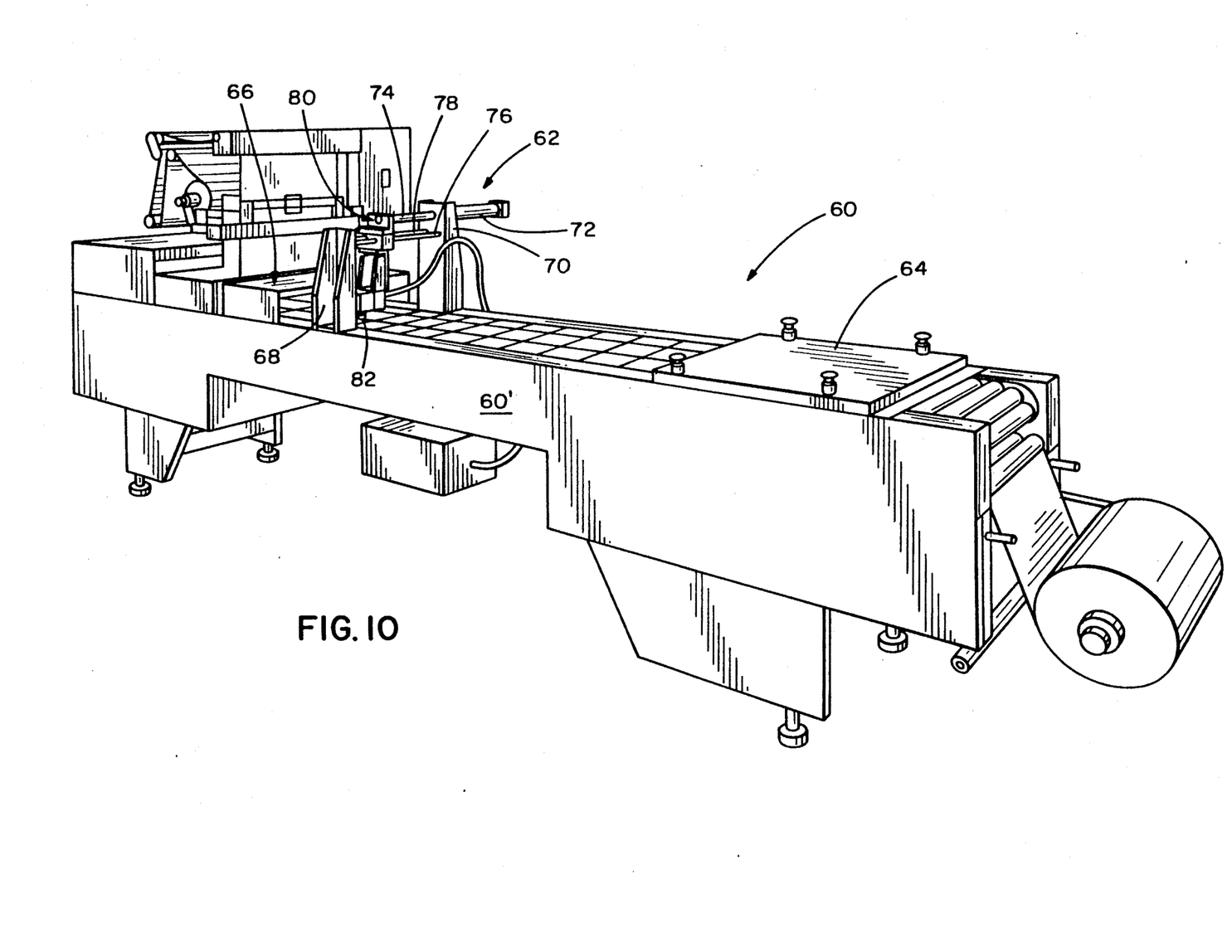
FIG. 10 is a perspective view showing the apparatus of the invention for making the reclosable, reusable package of FIG. 1.
Figure 11:
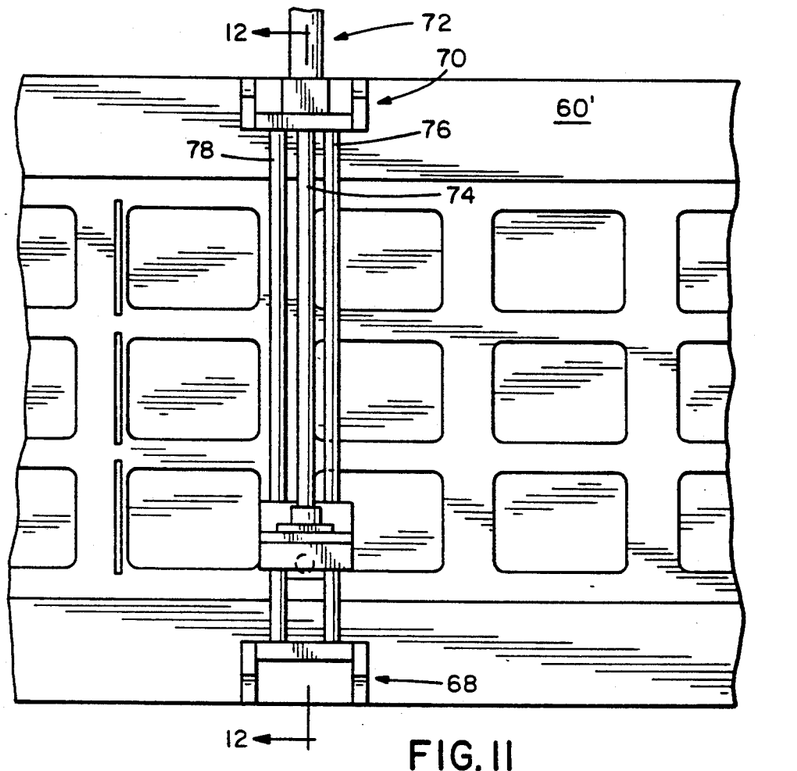
FIG. 11 is a top, plan view of the glue-applicator portion of the apparatus of FIG. 10.
Figure 12:
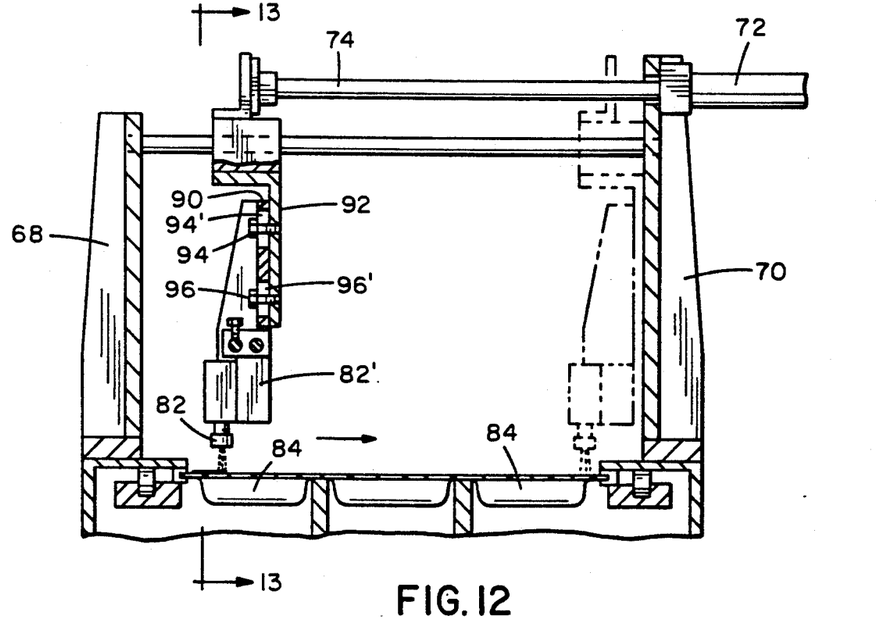
FIG. 12 is a cross-sectional view taken along line 12—12 FIG. 11.
Figure 13:
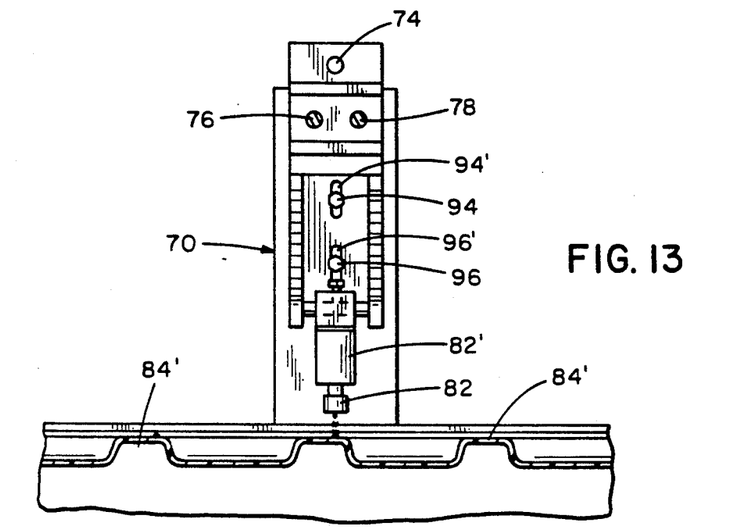
FIG. 13 is a cross-sectional view taken along line 13—13 of FIG. 12.

Referring to FIGS. 10-12, an apparatus 60 is shown for forming the package 10 of the invention. The apparatus 10 is a modification of a conventional package forming machine, such as: "TIROMAT", distributed by T W Kutter, Inc. of Avon, Massachusetts; or the "Hooper N2500" manufactured by Hooper, Inc. of Itasca, Illinois. The modification of these conventional vacuum-packaging machines lies in the addition of a glue-strip application station 62. This station 62 is interposed between the pocket-forming stations 64 at the front, or beginning, of the machine 60, and the sealing and vacuum-forming stations 66 at the rear, or end, of the machine. The glue-strip application station 62 is made up of a pair of oppositely-disposed, vertical stanchions or support columns 68, 70 supported at their lower ends to the main frame 60' of the apparatus 60, as clearly seen in FIG. 10. The vertical column 70 mounts a piston-cylinder arrangement 72 which reciprocates a rod 74. A pair of guide rods 76, 78 are connected between the two columns 68, 70 below the elevation of the piston rod 74. Mounted for guided movement along two guide rods is a glue-applicator 80. The end of the piston rod 74 is fixed to a portion of the housing of the glue-applicator 80, whereby the glue-applicator is reciprocated linearly above the plane of the advancing package film. In the version shown in FIG. 10, the package being formed is the package 10, where the glue-strip is applied to the inner film in which the product-containing pocket is formed at the stations 64. The glue-applicator 80 has a downwardly-extending dispensing nozzle 82 in close proximity to the horizontal plane of the advancing plastic film. As can be seen in FIG. 12, the nozzle 82 is supplied with sealing glue from a reservoir-housing 82'. The nozzle 82 and reservoir 82' are mounted by a pair of vertical plates 90, 92 that are slidable relative to each in the vertical direction. Screws 94, 96 cooperate with slots 94, 96' formed in the slidable plate 90, with the ends of the screws being threadingly received in holes formed in the fixed plate 92. By loosening the screws 94, 96, the slidable plate 90 may be moved to different relative positions with respect to the fixed plate 92, in order to adjust the vertical height of the nozzle 82 with respect to the film therebelow. The glue-applicator 80 is conventional, and may be that manufactured by the "NORDSON" Corp. of Amherst, Ohio, Model H-20A. As can be seen in FIG. 12, when the glue-applicator 80 is traversed across the film therebelow, the nozzle 82 dispenses a straight line of glue across a plurality of laterally-aligned package-halves 84, at that location on each package-half that is in the forward section 84' thereof, as seen in FIG. 13, which forward-section ends up constituting the upper edge surface 16 in the completed package 10 of FIG. 1.

Figure 14:
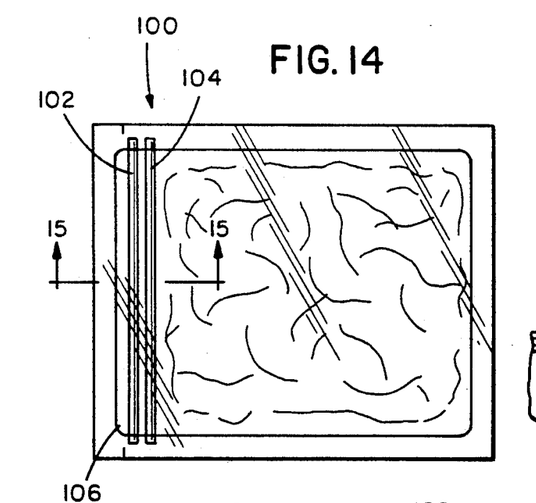
FIG. 14 is a top plan view of another modified form of the package of the invention, in which two, parallel gluestrips are provided.
Figure 15:
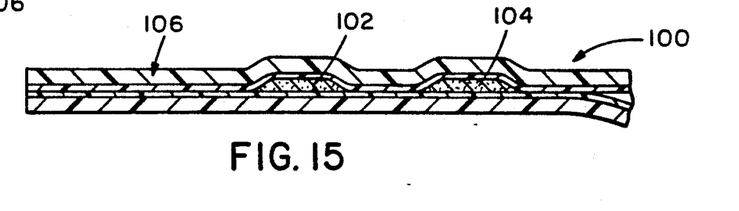
FIG. 15 is a cross-sectional view taken along line 15—15 FIG. 14.

FIGS. 14 and 15 show third embodiment 100 of the package of the invention. The package 100 is similar to the package 10 of FIG. 1, but has two linear strips 102, 104 extending across the width of the upper annular surface-portion or section 106. The two glue-strips 102, 104 are parallel to each other and slightly spaced apart in the direction of the length of the package. The provision of two such glue-strips creates a more air-tight and tacky reclosable opening.

Figure 16:
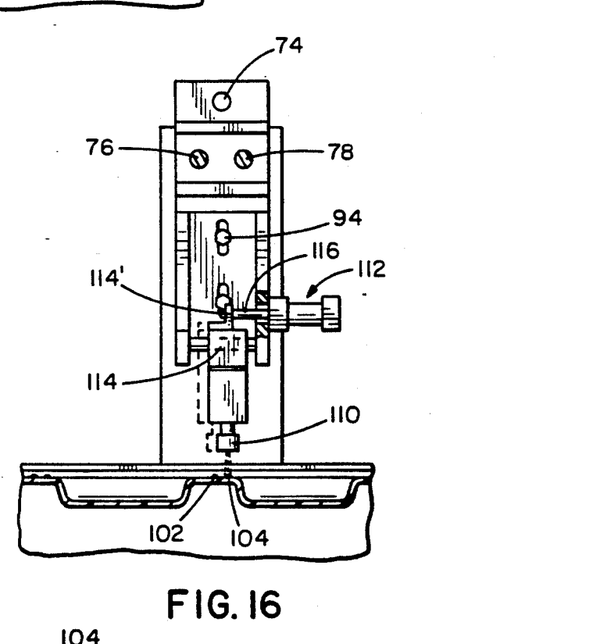
FIG. 16 is a side elevational view of a modified form of the glue applicator of the apparatus for forming the package of the invention, which modified form is used for applying the two parallel glue-strips for the package of FIG. 14.

FIG. 16 shows a modification of the glue-strip application station of the package forming machine for applying the two parallel glue-strips 102, 104 of the package 100. In this modification, the nozzle 110 is not traversed in the lateral, or widthwise direction, as seen in FIG. 12, but is also moved, or indexed, in the forward, or longitudinal, direction. A second piston-cylinder arrangement 112 is provided that is connected to reservoir-housing 114 of the glue-applicator via a bracket-mount 114'. The piston-cylinder arrangement 112 is itself directly mounted the slidable plate member 90. Thus, after the piston-cylinder arrangement 72 has caused the glue applicator and nozzle to traverse across the film therebelow along a first glue-line, the piston-cylinder is then actuated to index the nozzle a slight distance in the forward, longitudinal direction, after which the piston-cylinder arrangement 72 is actuated to return the nozzle along linear path to form a second glue-line parallel to and spaced from the first glue-line. It is noted that the apparatus 60 with glue-application station 62 may be used also, in some instances, for forming a pair of glue strips 102, 104, by indexing the film itself in the longitudinal direction, thereby obviating the need for longitudinal indexing piston-cylinder arrangement 112.

Figure 17:
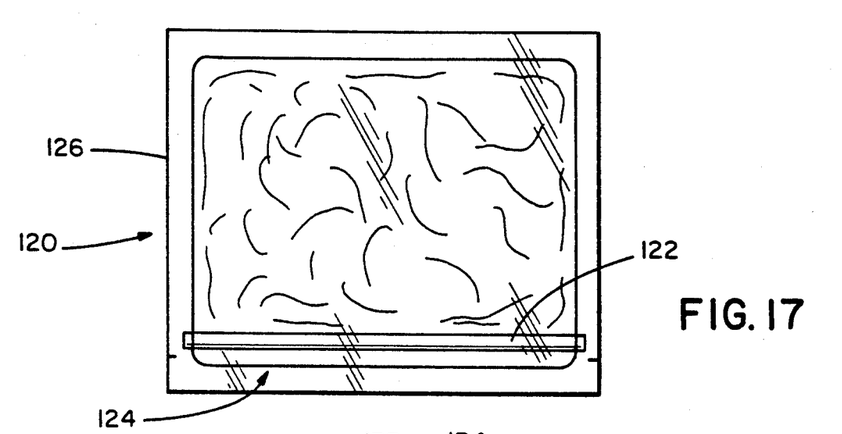
FIG. 17 is a top plan view of yet another modification of the package of the invention, in which the reclosable, reusable glue-strip is applied along a long side edge of the package.
Figure 18:
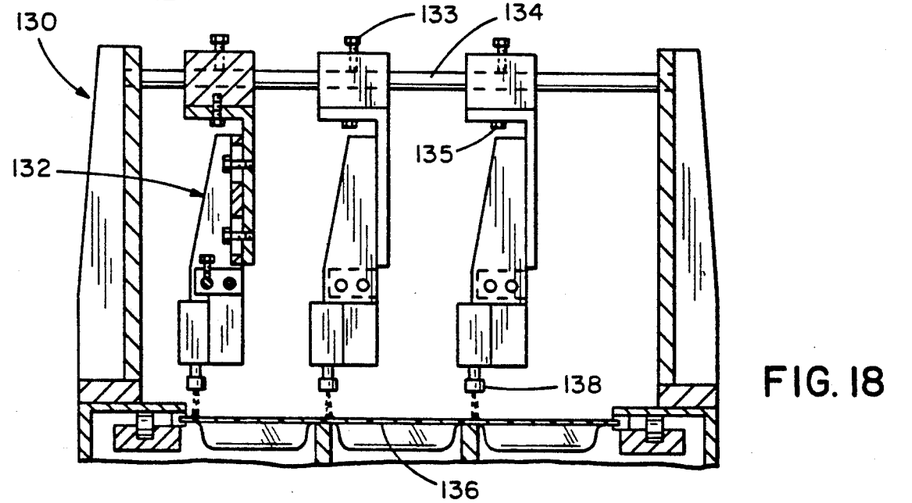
FIG. 18 is a side elevational view of another modified form of the glue applicator of the apparatus for forming the package of the invention, which modified form is used for applying the glue-strip for the package of FIG. 18.

FIG. 17 shows another modification of the package of the invention. The package 120 has a reclosable glue-strip 122 located along a long, side annular surface-portion 124 instead of a shorter, annular surface-portion 126 as in the other embodiments. Otherwise, the package 120 is the same as the package 10 or 40. FIG. 18 shows an apparatus 130 by which the glue-strip 122 is formed. The apparatus 130 is similar to the apparatus 60 of FIG. 10, but instead of one glue-applicator, a plurality of parallel-arranged glue-applicators 132 are provided and mounted on common support rods 134. The glue-applicators 132, however, are stationary, so no piston-cylinder arrangement is required, since the glue-strip is formed along the longer side of each package. Thus, the glue from each applicator is traversed along a side surface as the film 136 is conveyed below the applicator-nozzles 138. The number of glue-applicators 132 provided is equal to the number of longitudinal rows or lines, of packages being simultaneously formed and conveyed by the apparatus 130. Each glue-applicator 132 is adjustable slidable along the rod 134 in order for adjusting the relative spacing between the plurality of glue-applicators for adjustment to different widths of film layers, package sizes and the number of rows of packages being conveyed along the apparatus. Such adjustment is achieved by upper set screws 133 and lower set screws 135.

Figure 19:
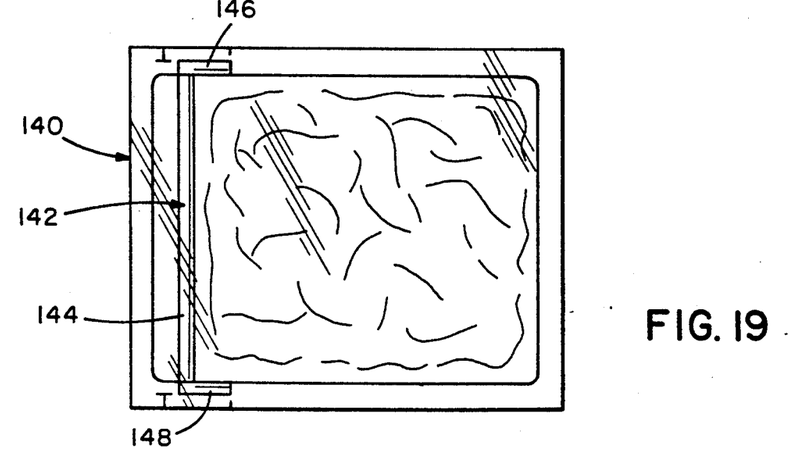
FIG. 19 is a top plan view of yet another modified form of the package of the invention.

FIG. 19 shows still another modification 140 of the package of the invention, where a glue strip 142 is provided, having a main elongated portion 144 along a narrow, annular surface-portion, and a pair of right-angle, shorter end-sections 146, 148 extending along the longer annular surface-portions. This modification provides greater reclosing capabilities. The package 140 is otherwise the same as the other embodiments of the invention.

The resealable glue used for forming the glue-strips may be that manufactured by H. B. Fuller & Co., of Minneapolis, Minnesota, product number HL-2228-X, which is approved by the FDA for direct contact with food, or product number HL-2021, which is FDA approved for indirect contact with food. These resealable glues will provide the above-described process where, upon opening the package for the first time, the glue strip will be separated into two sections, one adhering to one interior face and the other adhering to the other interior face. This is advanbtageous since upon opening bag each time, including the initial opening, the glue-strips will not shred or provide interconnecting threads that are messy, and inconvenient to the consumer. Of course, other resealable glues may be used that do not have this adherence-quality, and will not separate into two sections upon initial opening, although the reclosing of the package will be accomplished in any case, though with the strong likelihood of messy, interconnecting threads being produced.

The peripheral, non-resealable glue, when a nonconverted film is used, may be product number HL-2203-X, which is a permanent holt-melt glue, manufactured by H. B. Fuller & Co.

While there has been shown as the preferred embodiment that the glue strip 30, and the equivalents thereof, have been provided interiorly of the outer heat-seal, it is possible to utilize the glue-strip 30, or its equivalents, in order to act as the permanent seal as well. Thus, for example, the three sides of the package not containing the glue-strip 30 would be provided with a conventional heat-seal, such as that provided with converted films, or as non-resealable glue-seals for nonconverted films, the side having the resealable glue-strip would not have any other seal other than the glue strip 30, or its equivalents. Thus, in this modification, the glue strip 30 would be placed so that it at or very close to the very outer edge of the package, whereby the glue strip 30 serves both as the permanent seal for that side edge, and also serves as the reusable, resealable glue-strip allowing multi-openings and closings of the package.

While specific embodiments of the invention have been shown and described, it is to be understood that numerous changes and modifications may be made therein without departing from the scope, spirit and intent of the invention as set forth in the appended claims.

What I claim is:

1. In a package comprising a first layer, and a second layer, said second layer comprising a main portion having a product-storage compartment for storing products therein, and an annular section surrounding said compartment comprising a first annular surface-portion, a second annular surface-portion, a third annular surface-portion, and a fourth annular surface-portion, each of said annular surface-portions comprising a sealing, outer, edge-surface portion, said first layer being a substantially flat, planar sheet sandwiched over said second layer, said first layer also having mating first, second, third, and fourth annular surface-portions, with each of said annular surface-portions of said first, inner layer comprising a sealing, outer, edge-surface portion for sealed connection to a respective, said sealing, outer, edge-surface portion of said second layer, said first layer also comprising a central section that closes off said compartment of said second layer, the improvement comprising:

at least one glue-strip made of resealable glue located in at least one of said annular surface-portions of at least one of said layers for providing a reclosable, resealable bag for storing the remaining contents of the package.

2. The package according to claim 1, wherein said at least one glue-strip is positioned inwardly of at least one said sealing, outer, edge-surface portion of said at least one of said annular surface-portions, whereby, after the sealing, outer, edge-surface portion is torn away when opening the package, the glue-strip remains to provide a reclosable, resealable bag for storing the remaining contents of the package.

3. The package according to claim 2, wherein the outer perimeter of each said annular section is rectangular in shape, said first and third surface-portions being the short sides thereof, and said second and fourth being the long sides thereof; said at least one glue-strip being located on one of said first and third surface-portions.

4. The package according to claim 2, wherein the outer perimeter of each said annular section is rectangular in shape, said first and third surface-portions being the short sides thereof, and said second and fourth being the long sides thereof; said at least one glue-strip being located on one of said second and fourth surface-portions.

5. The package according to claim 2, wherein the outer perimeter of each said annular section is rectangular in shape, said first and third surface-portions being the short sides thereof, and said second and fourth being the long sides thereof; said at least one glue-strip comprising a main section located on one of said first and third surface-portions, and a pair of end sections projecting from the ends of said main section in a direction perpendicular to said main section.

6. The package according to claim 2, wherein said said first and third surface-portions are the top and bottom, and said second and fourth surface-portions are the sides of each said annular section; said at least one glue-strip having a first end and second end spaced from said first end, said at least one glue-strip having a length such that each said first and second end extends into a respective said sealing, outer, edge-surface portion of said second and fourth surface-portions, so that, upon opening of the package, the ends of the glue strip are anchored by the sealing edge strips of the sides of the package.

7. The package according to claim 2, wherein each said annular section of said layers further comprises a pair of oppositely-disposed notches formed in the two, parallel sealing, outer, edge-surface portions of the surface-portions extending perpendicularly to said one sealing, outer, edge-surface portion of said one surface portion in which is located said glue-strip; said pair of notches being positioned exteriorly closer to said sealing, outer, edge-surface portion of said one surface-portion than said glue-strip, whereby said notches aid in the tearing open of the package.

8. The package according to claim 2, wherein said package is made of two layers of converted film, each said sealing, outer, edge-surface portion being formed by pressing and heating said first and second layers for joining the sealant material of each layer; said glue-strip being located on the surface-face of said second layer facing toward said first layer.

9. The package according to claim 2, wherein said package is made of two layers of nonconverted film, each said sealing outer, edge-surface portion comprising a strip of non-resealing glue, the seal of each taking place after heating each said strip of non-resealing glue; said glue-strip being located on the surface-face of said second layer facing toward said first layer.

10. The package according to claim 1, wherein second layer comprises an elongated depression in which is provided said glue-strip, whereby the first layer's portion juxtapositioned over said glue-strip does not bulge outwardly.

* * * * *